Patented May 29, 1934

1,960,986

UNITED STATES PATENT OFFICE 1,960,986

PROCESS OF PREPARATION OF BERYLLIUM FLUORIDE FROM A DOUBLE FLUORIDE OF BERYLLIUM AND OF AN ALKALI METAL

Maurice Beja, Salindres, France, assignor to Compagnie de Produits Chimiques et Electrometallurgiques Alais, Froges et Camarque, Paris, France, a corporation of France No Drawing. Application December 14, 1932, Serial No. 647,294. In France December 19, 1931

11 Claims. (Cl. 23—88)

It it known that the most convenient process for the extraction of the beryllium oxide contained in beryl, consists in mixing this mineral with its own weight of $Na_2SiF_6$ and in calcining the mixture at about 650°–700° C. The iron oxide and the silica of the beryl remain unattacked, the alumina is transformed into insoluble cryolita, and the BeO yields double fluoride of beryllium and sodium (the composition of which is most frequently intermediate between $BeF_2.NaF$ and $BeF_2.2NaF$), which is extracted, by washing with water, from the product of the roasting.

Several processes have been proposed for separating the beryllium oxide from its combination with the sodium fluoride. For example ammonia is added to the aqueous solution of the double fluoride of beryllium and sodium, but by reason of the tendency which beryllium possesses to form complex bodies, the precipitation of the beryllium oxide is never complete. Moreover the precipitate of beryllium oxide thus obtained filters and is washed with great difficulty.

I have found that it is very easy to obtain pure fluoride of beryllium from a double fluoride of beryllium and an alkali metal by treating that salt, hot or cold, in solution or in aqueous suspension, with hydro-fluosilicic acid. In the case of a double fluoride of beryllium and sodium, according to the reactions:

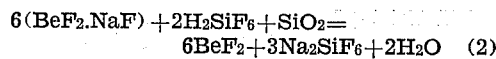

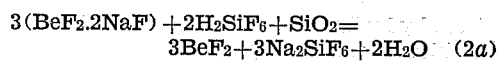

There is formed slightly soluble fluosilicate of soda, which is precipitated, whereas the very soluble fluoride of beryllium remains in solution. The fluo-silicate of soda formed is eliminated by filtration.

In the filtered solution of fluoride of beryllium, there remains a small quantity of $Na_2SiF_6$ corresponding to the solubility of this salt. In order to reduce this quantity to the minimum, the solution of beryllium fluoride is concentrated until it has a density of about 1.58 at the ordinary temperature. In this solution, the fluosilicate of soda is almost insoluble, so that all the $Na_2SiF_6$ which still remained in solution is precipitated. It is eliminated by filtration and there is obtained a solution of beryllium fluoride practically free from NaF.

The quantity of hydro-fluosilicate acid necessary according to the Equations (1) or (1a) in order to eliminate the alkali metal, can be reduced by one third by utilizing the free hydrofluoric acid formed by the reaction. For this it suffices to work in presence of silica. The hydrofluoric acid formed attacks the silica, furnishing a portion of the hydro-fluosilicic acid necessary. The equations of the reactions are then the following, in the case of the double fluoride of beryllium and sodium;

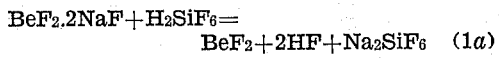

The solutions of beryllium fluoride in this case do not contain any free acid.

Finally there can be utilized, in order to precipitate the alkali metal, hydrofluoric acid or mixtures of hydrofluoric acid and hydrofluosilicic acid, conditionally upon adding the necessary quantity of silica for transforming the hydrofluoric acid into hydrofluosilicic acid.

This novel process of elimination of the alkali metal contained in the double fluoride of beryllium and alkali metal is very efficacious and very easy in application. It presents moreover the advantage of converting the alkali metal, which it is desired to eliminate, into alkali fluosilicate, which can serve for the formation of a fresh quantity of double fluoride of beryllium and alkali metal by calcination with beryl.

The formation of pure fluoride or beryllium according to this process leaves therefore no by-product.

Here is the result of an experiment which specifies, without limiting them however, the conditions in which there is obtained a satisfactory separation of the sodium contained in the double fluoride of beryllium and sodium:

Into a glass vessel, there are introduced 2.5 litres of hydrofluosilicic acid of a strength of 260 grams of $H_2SiF_6$ per litre. There are added, while stirring continually, 1 kilogram of double fluoride of beryllium and sodium containing 36.7 per cent of $BeF_2$ and 52.4 per cent of NaF, (that is to say, 1,425 parts of NaF for one part of $BeF_2$) as well as 125 grams of pure silica. Stirring is continued and (the liquid) heated to about 70°. The reaction, which is very rapid, can be followed by observing the diminution which the acidity of the solution undergoes in proportion to the progress of the reaction. The reaction once terminated, the fluosilicate of soda formed is filtered. There are collected about 1200 grams of it, consisting of 93 per cent of $Na_2SiF_6$ and 1.3 per cent of $BeF_2$, which will be utilized for a fresh attack on beryl, so that the $BeF_2$ contained in this fluosilicate of soda is not lost. The solution of $BeF_2$ is concentrated to the density of 1.58. It allows some tens of grams of fluosilicate of soda to settle, which are eliminated by filtration. The concentrated solution of fluoride of beryllium is then evaporated to dryness and in the solid product obtained there are found 0.02 parts of NaF for one part of $BeF_2$, whereas in the double fluoride or beryllium and sodium employed there were 1425 parts of NaF for one part of $BeF_2$. The efficiency of elimination of the sodium has therefore been 98.6 per cent.

It has been mentioned hereabove that it is possible to eliminate in a practically complete manner the alkali fluoride, contained in the double fluoride of beryllium and alkali metal, by treating this product, in solution or in aqueous suspension, with a mixture of hydro-fluosilicic acid and silica, for example according to the reaction:

$$6(BeF_2.NaF) + 2H_2SiF_6 + SiO_2 = 6BeF_2 + 3Na_2SiF_6 + 2H_2O. \quad (2)$$

This reaction is effected in reality in several stages. The free hydro-fluosilicic acid first precipitates a part of the sodium, in conformity with the equation:

$$6(BeF_2.NaF) + 3H_2SiF_6 = 6BeF_2 + 3Na_2SiF_6 + 6HF \quad (3)$$

Free hydrofluoric acid is formed, which attacks the silica in conformity with the equation:

$$6HF + SiO_2 = H_2SiF_6 + 2H_2O. \quad (4)$$

By combining the Reactions (3) and (4), the Reaction (2) is regained.

It will be understood that the carrying out of the Reaction (2) will be the more rapid as the silica brought into operation is more easily attackable by the hydrofluoric acid in the Equation (4). If pulverized quartz is taken as source of silica, it will be necessary to apply heat in order to accelerate the reaction. On the contrary, if precipitated silica is taken, the attacking of this silica by HF will be done rapidly even in the cold.

A silica both very pure and very easily attackable by HF is obtained by condensing gaseous $SiF_4$ in water.

Then, in conformity with the equation:

$$3SiF_4 + 2H_2O = 2H_2SiF_6 + SiO_2, \quad (5)$$

there is formed the mixture $(2H_2SiF_6 + SiO_2)$ necessary to the reaction (2).

It is therefore evident that there can be caused to act directly upon the double fluoride of beryllium and an alkali metal, in solution or in aqueous suspension, instead of the mixture of hydrofluosilicic acid and silica, gaseous fluoride of silicon, which presents the advantage mentioned above from the point of view of the rapidity of the reaction. In this case there is carried out the complete reaction:

$$2(BeF_2.NaF) + SiF_4 = 2BeF_2 + Na_2SiF_6. \quad (6)$$

It has been found further that the hydrofluosilicic acid, or the mixture of hydrofluosilicic acid and silica, can be replaced either by fluosilicate of beryllium or by a salt of hydrofluosilicic acid, the metal of which yields an insoluble fluoride; the elimination of the alkali fluoride and the obtaining of the fluoride of beryllium take place by reaction in aqueous medium between the double fluoride of beryllium and alkali metal and the salt of hydrofluosilicic acid. In the case of fluosilicate of beryllium, there will occur the following reaction:

$$2(BeF_2.NaF) + BeSiF_6 = 3BeF_2 + Na_2SiF_6 \quad (7)$$
soluble  soluble  slightly soluble.

For example, fluosilicate of calcium in solution or in the solid state can be introduced into a solution or aqueous suspension of $BeF_2.NaF$; there will occur the reaction:

$$2(BeF_2.NaF) + CaSiF_6 = 2BeF_2 + Na_2SiF_6 + CaF_2 \quad (8)$$
soluble  slightly soluble  insoluble All the calcium will be eliminated in the state of insoluble fluoride, and the greater part of the sodium will be precipitated in the state of fluosilicate, slightly soluble. The fluosilicate of sodium left in solution will be eliminated by concentration of the solution of $BeF_2$, as has been described above.

Instead of fluosilicate of calcium, there can be utilized fluosilicate of magnesium or any other fluosilicate the metal of which yields an insoluble fluoride.

Fluosilicate of alumina can also be utilized according to the reaction:

$$(6+n)(BeF_2.NaF) + Al_2(SiF_6)_3 = (6+n)BeF_2 + 3Na_2SiF_6 + Al_2F_6.nNaF. \quad (9)$$
soluble  slightly soluble  insoluble The fluoride of beryllium remains in solution with a little fluosilicate of sodium, and there is precipitated a mixture of fluosilicate of sodium and cryolite.

What I claim is:

1. A process of preparation of fluoride of beryllium, free from alkali metal fluoride, from a double fluoride of beryllium and of an alkali metal, consisting in treating that double fluoride, in an aqueous medium, with a reagent adapted to transform the alkali metal fluoride into a slightly soluble alkali metal fluosilicate, and in filtering to eliminate said alkali metal fluosilicate.

2. A process of preparation of fluoride of beryllium, free from alkali metal fluoride, from a double fluoride of beryllium and of an alkali metal, consisting in treating that double fluoride, in aqueous medium, with a reagent, containing fluorine and silicon, adapted to transform the alkali metal fluoride into a slightly soluble alkali metal fluosilicate, and in filtering to eliminate said alkali metal fluosilicate.

3. A process of preparation of fluoride of beryllium, free from alkali metal fluoride, from a double fluoride of beryllium and of an alkali metal, consisting in treating that double fluoride, in an aqeuous medium, which hydrofluosilicic acid, and in filtering to eliminate the alkali metal fluosilicate.

4. A process of preparation of fluoride of beryllium, free from alkali metal fluoride, from a double fluoride of beryllium and of an alkali metal, consisting in treating that double fluoride, in an aqueous medium, with a mixture of hydrofluosilicic acid and silica, and in filtering to eliminate the alkal metal fluosilicate.

5. A process of preparation of fluoride of beryllium, free from alkali metal fluoride, from a double fluoride of beryllium and of an alkali metal, consisting in treating that double fluoride, in an aqueous medium, with a mixture of hydrofluoric acid and silica, and in filtering to eliminate the alkali metal fluosilicate.

6. A process of preparation of fluoride of beryllium, free from alkali metal fluoride, from a double fluoride of beryllium and of an alkali metal, consisting in treating that double fluoride, in an aqueous medium, with a soluble salt of hydrofluoric acid, and in filtering to isolate the fluoride of beryllium thus formed.

7. A process of preparation of fluoride of beryllium, free from alkali metal fluoride, from a double fluoride of beryllium and of an alkali metal, consisting in treating that double fluoride, in an aqueous medium, with fluosilicate of beryllium, and in filtering to eliminate the alkali metal fluosilicate and thus isolate the fluoride of beryllium formed.

8. A process of preparation of fluoride of beryllium, free from alkali metal fluoride, from a double fluoride of beryllium and of an alkali metal, consisting in treating that double fluoride, in an aqueous medium, with a soluble salt of hydrofluosilicic acid, the metal of which yields an insoluble fluoride, and in filtering to eliminate the alkali metal fluosilicate and thus isolate the fluoride of beryllium formed.

9. A process of preparation of fluoride of beryllium, free from alkali metal fluoride, from a double fluoride of beryllium and of an alkali metal, consisting in treating that double fluoride, in an aqueous medium, with a soluble salt of hydrofluosilicic acid, the metal of which yields a fluoride capable of combining with the alkali metal fluoride with formation of an insoluble compound, and in filtering to eliminate the alkali metal fluosilicate and the said insoluble compound and thus isolate the fluoride of the beryllium formed.

10. A process of preparation of fluoride of beryllium, free from alkali metal fluoride, from a double fluoride of beryllium and of an alkali, consisting in treating that double fluoride, in an aqueous medium, with a reagent adapted to transform the alkali metal fluoride into a slightly soluble alkali metal fluosilicate, and in filtering to eliminate said alkali metal fluosilicate, and in concentrating the solution of fluoride of beryllium thus obtained, for the purpose described.

11. A cyclic process of preparation of fluoride of beryllium, free from alkali metal fluoride, from a double fluoride of beryllium and of an alkali metal, consisting in treating that double fluoride, in an aqueous medium, with a reagent adapted to transform the alkali metal fluoride into a slightly soluble alkali metal fluosilicate, and in filtering to eliminate said alkali metal fluosilicate, and mixing and calcining said alkali metal fluosilicate with beryl, to recover the double fluoride of beryllium and of alkali metal.

MAURICE BEJA